United States Patent

Rice et al.

[11] 3,991,903
[45] Nov. 16, 1976

[54] QUICK-DISCONNECT VALVE CLOSURE STRUCTURE

[75] Inventors: Donald D. Rice; Herbert H. Walton, both of Marshalltown, Iowa

[73] Assignee: Fisher Controls Company, Marshalltown, Iowa

[22] Filed: May 2, 1975

[21] Appl. No.: 574,175

[52] U.S. Cl. .............................. 220/327; 137/315
[51] Int. Cl.² ..................................... B65D 45/02
[58] Field of Search .................. 137/315; 220/327; 285/330

[56] References Cited
UNITED STATES PATENTS

| | | | |
|---|---|---|---|
| 1,389,542 | 8/1921 | Wereley | 220/327 |
| 1,665,368 | 4/1928 | Joy | 220/327 |
| 2,022,868 | 12/1935 | Nelson | 220/327 |
| 3,349,947 | 10/1967 | Zumwalt | 220/327 |
| 3,462,041 | 8/1969 | Wilson | 220/327 |

Primary Examiner—Martin P. Schwadron
Assistant Examiner—G. L. Walton
Attorney, Agent, or Firm—James C. Bolding

[57] ABSTRACT

Described herein is a structure for attachment of two parts of a valve structure in a pressure-tight leakproof relationship, which employs a minimum number of parts and may be quickly disassembled, but which is nonetheless strong, rugged, and durable. This structure includes a first member having two pairs of spaced-apart lugs protruding in a direction generally parallel to the axis of an opening in the first member. A second member is provided which extends into the opening and includes two ears, each ear being adapted for placement between two lugs. The lugs are provided with matching transverse holes, whereby a bolt or pin may be placed through one lug of a pair, then over a portion of an ear, then into the second lug of the pair for securing the two members together in a predetermined relationship. Means are provided for detection of internal pressure in the valve to prevent disassembly thereof prior to removal of the pressure.

6 Claims, 2 Drawing Figures

QUICK-DISCONNECT VALVE CLOSURE STRUCTURE

BACKGROUND OF THE INVENTION

1. Field of the Invention

This invention relates generally to pressure-tight closures. More particularly, it relates to a structure for securing two parts of a valve together in a leakproof relationship.

2. Description of the Prior Art

In assembly of high pressure fluid handling equipment, it is necessary to secure parts of a valve together in such a way as to prevent leaks of the contained fluid. It is frequently desirable that the two parts be secured together so as to be conveniently and quickly separable in the event that maintenance is required. One such situation is encountered in securing a valve bonnet to a valve body.

Heretofore, it has been common to provide a valve body and a flanged valve bonnet each having a flat surface, and a gasket fitting between these flat surfaces. To effect a seal between these surfaces, bolts or studs have been used which are inserted through holes near the periphery of the valve bonnet flange and screw into holes tapped into the valve body. With this arrangement it is necessary to provide sufficient space around the bolt heads or nuts so that a wrench may be used to remove them when maintenance is required. Moreover, at least four, and frequently six or eight, bolts are normally employed in a closure of this sort, and it is necessary to remove all of these bolts to gain access to the interior of the valve.

SUMMARY OF THE INVENTION

The general purpose of this invention is to provide a valve closure structure which employs a minimum number of bolts.

A further object of this invention is to provide a valve structure which may be quickly and conveniently disassembled using a minimum number of tools.

Yet another object is to provide a valve structure in which fluid pressure within the valve may be detected prior to disassembly.

A still further object is to provide a valve which requires less working room for maintenance, and which is more compact, than prior art valves.

To achieve these as well as other objects, we provide a valve structure wherein a valve body member having an interior cavity and an opening communicating from this cavity with the exterior of the valve body. Four spaced-apart lugs are provided on the surface of the body member, these lugs being arranged in pairs on either side of the opening and extending from the body generally parallel to the axis of the opening. A valve bonnet is provided which has a portion extending into the body opening and sealing against the wall thereof, and which has two radially-extending ears, one ear fitting between each pair of lugs on the valve body. Matching holes are provided through the pairs of lugs for receiving two bolts or pins, these bolts or pins extending between the lugs and over portions of the ears whereby the bonnet is retained on the valve body.

The heads of these bolts or pins may be covered by a cover plate secured to the valve bonnet by a screw or other suitable means which must be displaced prior to removal of the bolts or pins. To warn peronnel of potentially dangerous fluid pressure within the valve prior to disassembly, a small bleed passage may be provided which communicates from the interior of the valve to the atmosphere by way of the hole in which the cover plate retaining screw is normally retained, whereby when the retaining screw is removed a small quantity of the fluid will escape.

By the use of this structure, only two bolts are required in order to secure the valve bonnet to the body, and the bolts are removable toward the side of the valve rather than upwardly where space is at a premium.

DESCRIPTION OF THE DRAWINGS

Reference is now made to the drawings, in which.

DESCRIPTION OF A PREFERRED EMBODIMENT

Figure 1:
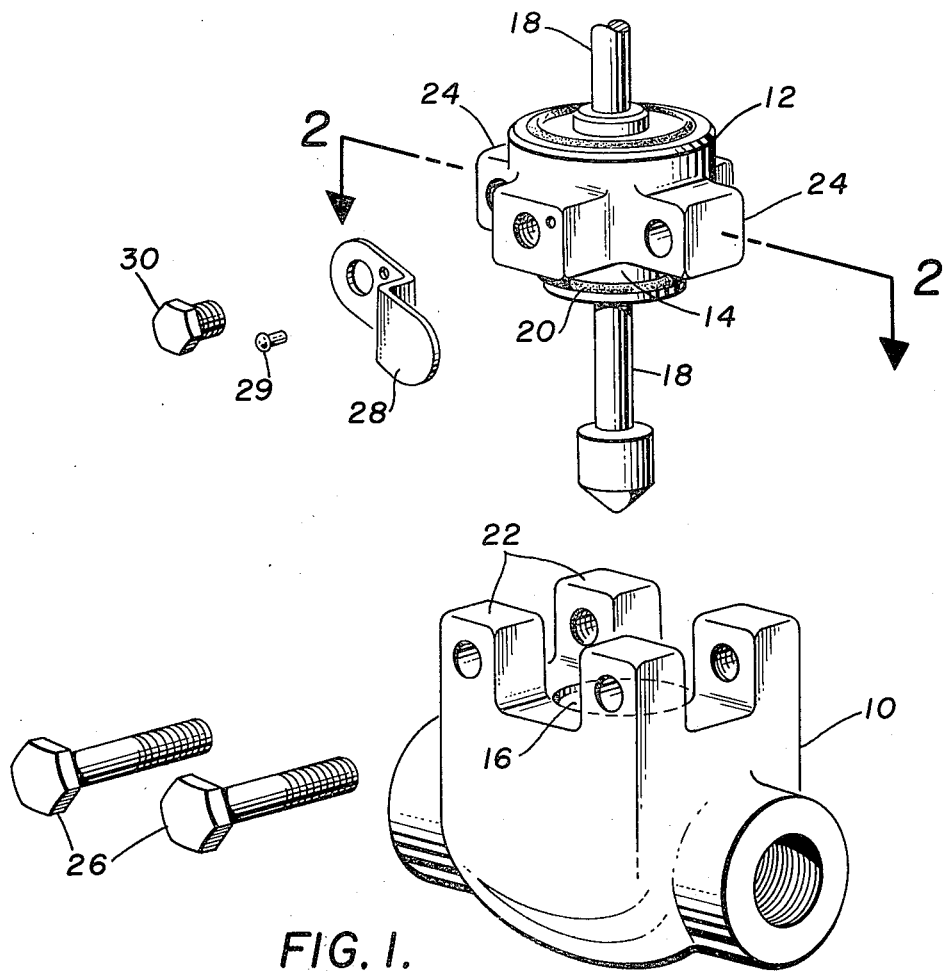
FIG. 1 is a partial exploded view of a valve which employs a closure according to this invention for securing the valve bonnet to the valve body.

In FIG. 1, there is shown a partial exploded view of a control valve structure wherein it is required to secure a valve body 10 to a valve bonnet 12 in a leakproof relationship. A cylindrical projection 14 on the bottom of the bonnet 12 cooperates with a cylindrical opening 16 in the valve body 10 to insure alignment of the body and bonnet. It will be understood that this body opening 16 communicates with a central cavity in the valve body 10 which is contained a conventional valve plug and seat arrangement when the valve is assembled. In this embodiment, an O-ring 20 is retained in an annular groove in the surface of the cylindrical projection 14, and when the projection 14 is inserted into the cylindrical body opening 16 the O-ring 20 is compressed between the two parts, thereby effecting a seal therebetween.

A valve stem 18 is here shown extending upwardly through the valve bonnet 12. It will be understood that any conventional stem packing arrangement may be employed to seal between the valve stem and bonnet, and that a conventional valve actuator is mounted on top of the bonnet for actuation of the valve stem between its open and closed positions.

Projecting upwardly from the valve body 10 are two pairs of lugs 22, while the bonnet is provided with two ears 24. Each of these ears 24 fits between a pair of lugs 22 and secures the valve bonnet 12 against rotation with respect to the valve body 10. Extending transversely through each pair of the lugs 22 and the corresponding ear 24 is a hole for receiving a crossbolt 26 which retains the bonnet 12 on the valve body 10.

Figure 2:
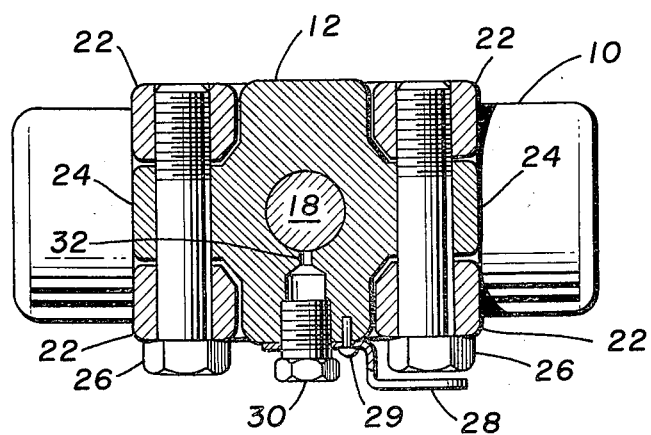
FIG. 2 is a horizontal sectional view of the valve of FIG. 1 taken along the line 2—2.

In this embodiment, a bolt cover plate 28 is provided which is rotatably retained on the side of the valve bonnet 12 by means of a rivet 29, and is normally secured against rotation by a pipe plug 30 in a position in which the cover plate 28 covers the head of one of the crossbolts 26. Before the crossbolt 26 can be removed to disassemble the valve, the cover plate 28 must first be rotated after removal of the pipe plug 30. As can be more clearly seen in FIG. 2, a small bleed passage 32 communicates between the bottom of the tapped hole in which the pipe plug 30 is normally received and the opening through the valve bonnet through which the valve stem 18 protrudes. In the event that fluid under pressure is present in the valve when it is desired to disassemble the valve for maintenance, a small amount of the fluid will escape through the bleed passage 32 around the pipe plug 30 when the pipe plug is loosened preparatory to its removal. The escape of this fluid will alert personnel in the area to the potential danger, so that corrective action may be taken. Moreover, when this valve is reassembled after maintenance the cover plate 28 must be rotated back to a position in which it covers the head of one of the crossbolts 26 before the pipe plug 30 can be reinstalled to seal the bleed passage 32.

It will be understood by those skilled in the art that there is thus provided a valve closure structure which employs fewer bolts than have been required by prior art closures, and which may be more quickly and conveniently disassembled using a minimum number of tools, but which is nonetheless rugged and strong. It will further be clear that by virtue of the use of crossbolts which are removed to the side of the valve rather than upwardly, it is unnecessary to provide working room for bolt removal between the valve bonnet and an actuator mounted thereon, as in the prior art valves, and that a valve constructed according to this invention may consequently be more compactly constructed.

Having thus described a presently preferred embodiment of this invention, many modifications and variations will occur to those skilled in the art in the light of the above teachings. It is therefore to be understood that this invention may be practiced otherwise than as herein specifically described.

What is claimed is:

1. A closure structure for a valve or the like, comprising:
    a first member having an opening to be closed, said opening having an interior surface,
    a second member having a projecting portion extending into said opening, said portion including circumferential resilient sealing means for slidingly engaging said interior surface of said opening in radial compression thereagainst,
    one of said members being provided with first and second pairs of lugs extending generally parallel to said projecting portion and said opening,
    the other of said members having first and second ears projecting substantially perpendicular to said projecting portion and said opening, said first ear fitting between said first pair of lugs and said second ear fitting between said second pair of lugs, and
    a first retaining member extending transversely through said first pair of lugs and over a portion of said first ear, and a second retaining member extending transversely through said second pair of lugs and over a portion of said second ear, whereby each of said ears is retained between a pair of said lugs,
    said retaining members being transversely removable to effect disassembly of said first member from said second member.

2. A closure structure according to claim 1, wherein said circumferential resilient sealing means is an O-ring retained in a circumferential groove in said projecting portion.

3. A closure structure according to claim 2, further including means for detecting fluid pressure within said structure prior to removal of said retaining members.

4. A closure structure according to claim 3, further including means for preventing removal of said retaining members prior to actuation of said detecting means.

5. A closure structure according to claim 4, wherein:
    said detecting means is a threaded member received in a hole in said first member, said hole communicating with the interior of said structure by means of a fluid-restricting passageway, and
    wherein said means for preventing removal of said retaining means is a cover plate secured to said first member by said threaded member, whereby said cover plate must be displaced before said retaining means may be removed.

6. A closure structure according to claim 4, wherein:
    said detecting means is a threaded member received in a hole in said second member, said hole communicating with the interior of said structure by means of a fluid-restricting passageway, and
    wherein said means for preventing removal of said retaining means is a cover plate secured to said second member by said threaded member, whereby said cover plate must be displaced before said retaining means may be removed.

* * * * *